(12) United States Patent
Hutchison et al.

(10) Patent No.: US 6,651,123 B1
(45) Date of Patent: Nov. 18, 2003

(54) FILE SYSTEM LOCKING

(75) Inventors: Robert Brian Hutchison, Raleigh, NC (US); Stuart Te-Hui Shih, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/539,335

(22) Filed: Mar. 30, 2000

(51) Int. Cl.[7] .............................................. G06F 12/14

(52) U.S. Cl. ........................... 710/200; 703/15; 703/23; 703/26; 703/27; 709/1; 709/202; 713/136; 713/138; 713/139; 713/140

(58) Field of Search .......................... 710/200; 703/23, 703/15, 26, 27; 709/1, 202; 717/136–161

(56) References Cited

U.S. PATENT DOCUMENTS

| | | | |
|---|---|---|---|
| 5,202,971 A | | 4/1993 | Henson et al. ............... 395/425 |
| 5,226,159 A | | 7/1993 | Henson et al. ............... 395/650 |
| 5,303,368 A | | 4/1994 | Kotaki ........................ 395/650 |
| 5,537,645 A | | 7/1996 | Henson et al. ............... 395/650 |
| 5,566,319 A | | 10/1996 | Lenz .......................... 395/474 |
| 5,615,373 A | | 3/1997 | Ho ............................ 395/726 |
| 5,892,954 A | | 4/1999 | Tomas et al. ................ 395/726 |
| 5,926,631 A | * | 7/1999 | McGarvey ................... 703/23 |
| 6,091,897 A | * | 7/2000 | Yates et al. .................. 717/138 |
| 6,104,868 A | * | 8/2000 | Peters et al. ................. 709/202 |
| 6,151,703 A | * | 11/2000 | Crelier ........................ 717/136 |
| 6,502,237 B1 | * | 12/2002 | Yates et al. .................. 717/136 |

OTHER PUBLICATIONS

"Algorithm to Support the Emulation of UNIX Popen() and Pclose() System Calls in OS/2," *IBM Technical Disclosure Bulletin*, vol. 38 No. 01, Jan. 1995, pp. 213–216.

"Abstracted File Lock Manager to Support the Emulation of UNIX FCNTL() and LOCKFX() System Calls in OS/2," *IBM Technical Disclosure Bulletin*, vol. 38 No. 01, Jan. 1995, pp. 387–391.

3.6 zApp DOS, Windows, Windows NT, OS/2 Portable Class Library. Http://www.desy.de/user/projects/C++/projects/zapp.html.*

MIT Computer Architecture Group, Professor Rinard (Operating Systems Lectrue Notes). Http://www.ca-g.lcs.mit.edu/ ~rinard.*

The National Scalable Cluster Project, University of Pannsylvania. AIX Version 4.3 Kernel Extensions and Device Support Programming Concepts. http://nscp.upenn.edu/aix4.3html/aixprggd/kernextc/lock_kernsvcs.htm.*

Tim. Lindholm, "The Java Virtual Machine Specification", 1999, Sun MicroSystem, 2nd Ed., http://java.sun.com/docs/books/vmspec/2nd–edition/html/VMSpecTOC.doc.html.*

James L. Peterson, Abraham Silberschatz, "Operating System Concepts", 1985, Addison Westley, 2nd Ed., pp 39–50.*

* cited by examiner

Primary Examiner—Gopal C. Ray
Assistant Examiner—Justin King
(74) Attorney, Agent, or Firm—J. Bruce Schelkopf; Winstead Sechrist & Minick

(57) ABSTRACT

The present invention utilizes a file locking emulator between an application program and an operating system. The file locking emulator comprises an application program interface and a file lock supervisor. The file locking emulator receives the file locking requests from the application program and generates file requests and file lock query commands. When the application program interface receives a file request it first checks the files lock status and then either returns an error for incompatible file requests or executes the compatible lock request along with any other compatible operation request such as a read, write or truncate file operation. Only code in the file request emulator needs to be rewritten when an application program is ported to different operating systems sharing incompatible but executable processes. In this manner tested code of the application program does not have to be rewritten.

24 Claims, 10 Drawing Sheets

FILE SYSTEM LOCKING

TECHNICAL FIELD

The present invention relates in general to data processing systems, and in particular, to a method and system for handling locking protocol disparities between an application program and an operation system on which the application program is installed.

BACKGROUND INFORMATION

There are many operating systems, for example OS/2, WINDOWS, NT, UNIX and AIX. If an application was written to execute on one operating system, all processes and operations that the application program can execute may not be compatible with the operating system to which the application program is ported. In the past, if it was desired to have an application program ported to operating systems on which it was not fully compatible, then portions of the software had to be rewritten specifically for each different operating system. Rewriting existing software code is time consuming and a rewrite of a debugged and operational application program may cause errors. File management is one of those processes that may differ between operating systems. Operating systems have routines that are used to lock and unlock files. AIX, for example has file locking and unlocking routines that support operations that are not compatible with NT and OS/2. An exemplary application program, written on an NT or OS/2 platform and subsequently ported to AIX, may cause file corruption and serialization errors if the differences in file locking and unlocking are not handled correctly.

File corruption may occur when multiple applications try to access and write to files that are not properly locked. Non-serial operations errors may occur when a serial operation on a file is allowed without proper locking, for example, one application may access data, modify it, and then not return its result before another application accesses the same data. In this case, after both applications return their results, the data stored in the file is now in error. In this example, a serial operation cannot be performed on the file without proper locking in effect.

There is therefore a need for a method for handling the problem of incompatibilities of an application program when it is ported to run on different operating systems without rewriting the application program.

SUMMARY OF THE INVENTION

The present invention discloses the use of a file request emulator that may be integrated within an application program that may be ported to various different Operating Systems (OS).

Operating Systems have processes commonly executed by a variety of different Application programs, however, these processes may contain features all of which are not compatible within the Operating Systems. File locking is one of those processes that many Application programs use, however, one operating system may allow more complex file locking than another. If an Application program was written on one OS platform and then ported to another, the Application program may be able to issue file locking requests that may result in corrupted files. The present invention uses a file request emulator and in particular a file locking emulator between the Application program and an OS. The file locking emulator determines the compatibility of file locking requests between a given ported application and an operating system. Only valid requests are passed to the OS, invalid or incompatible requests result in returned error statements which may also contain recovery options available to a user of the application program. In this manner, only the file request emulator has to have code changes for different Operating Systems and the tested code of the Application program can remain unchanged.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
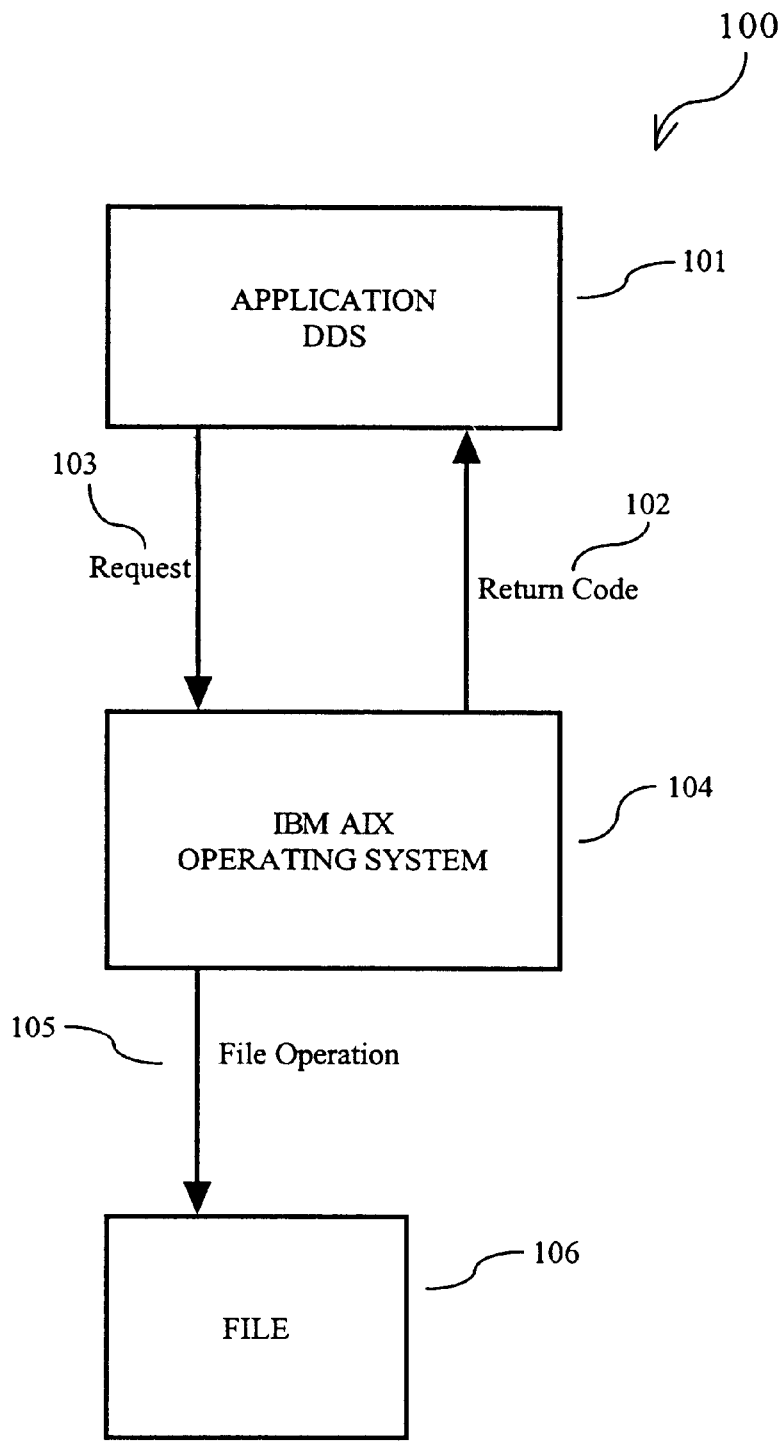
FIG. 1 is a prior art illustration of communication between an application program and a file manager within an Operating System (OS)

In the following description, numerous specific details are set forth such as specific operating systems, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 5:
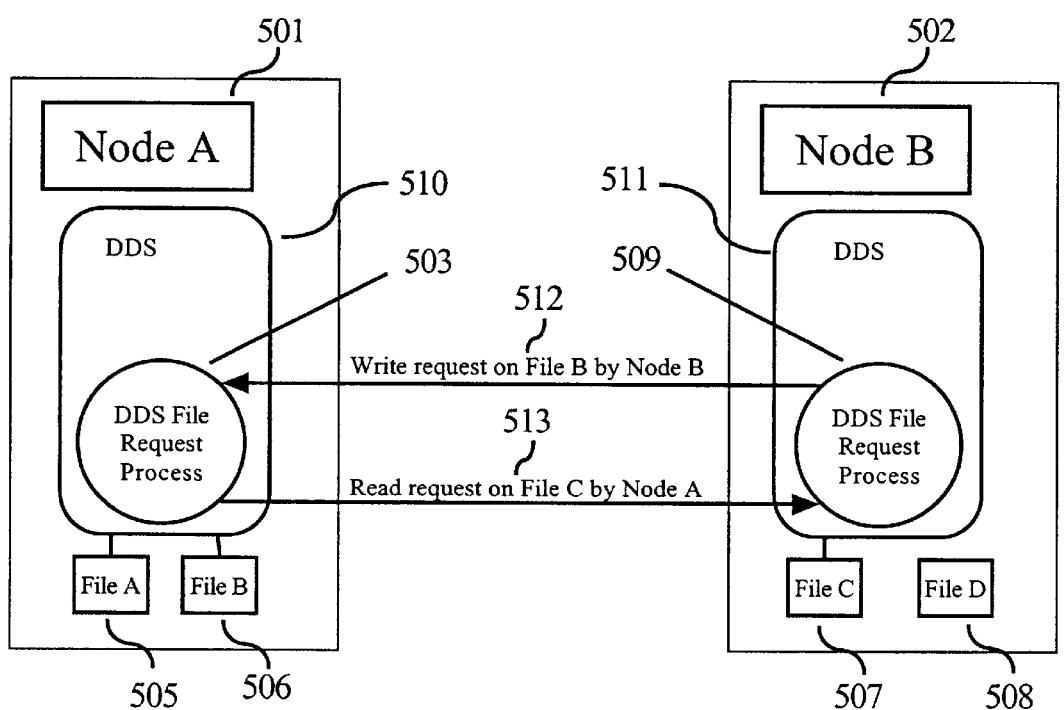
FIG. 5 illustrates two computer nodes exchanging file requests.

The IBM AIX Operating System performs file locking in a manner that is inconsistent with the file locking required by the Distributed Data Services (DDS) V1.6 product that was developed on the Windows NT and IBM OS/2 Operating System. DDS processes local and remote interprocess communication and has the ability to receive and apply distributed data. Part of implementing this feature requires that each node (computer) running DDS be able to execute local file operations on behalf of applications running locally and on other remote nodes running DDS. DDS specifically creates a process which spawns its own threads to service these files requests. Threads in this context are the sequence of executions by the operation system to accomplish services. If any of these threads in the process determines that an incoming file request is for the node it executes on, then an attempt is made to perform the file operation locally (FIG. 5). The problem that arises from running DDS on AIX is that while file locks are enforced between file handles (temporary reference assignments by the OS to a file and used by the OS throughout an access) on Windows NT and OS/2, they are enforced between different processes on AIX. With only one DDS process servicing incoming file requests, no file locking validation is done for any DDS requested file operations. The three problems introduced by this type of file locking are summarized below. In all three cases, the same process controls all file locks and handles. The following details three problems associated with incompatible file locking.

(1) EXCLUSIVE ACCESS LOCKS ON A FILE ARE NOT ENFORCED

Case 1.1—A file region locked with exclusive access by file handle A can have any of that region unlocked by file handle B.

Case 1.2—A file region locked with exclusive access by file handle A can have any of that region re-locked by file handle B as a shared or exclusive lock.

Case 1.3—A file region locked with exclusive access by file handle A can have that region modified by file handle B through a write or truncate operation. That locked file region can also be read by file handle B.

(2) SHARED ACCESS ON A FILE ARE NOT ENFORCED

Case 2.1—A file region locked with shared access by file handle A can have any of that region unlocked by file handle B.

Case 2.2—A file region locked with shared access by file handle A can have any of that region re-locked by file handle B as a shared or exclusive lock.

Case 2.3—A file region locked with shared access by file handle A can have that region modified by file handle B through a write or truncate operation.

(3) ANY REGION CAN BE UNLOCKED

Case 3.1—A file region locked by file handle A can have any of that region unlocked by file handle B.

Case 3.2—A file region can be unlocked by file handle A regardless of even if that region is not actually locked. This is actually an AIX-related peculiarity and not one resulting from how file locks are enforced.

The following further illustrates an example of file corruption and a serialization error.

File Corruption Example

Figure 9:
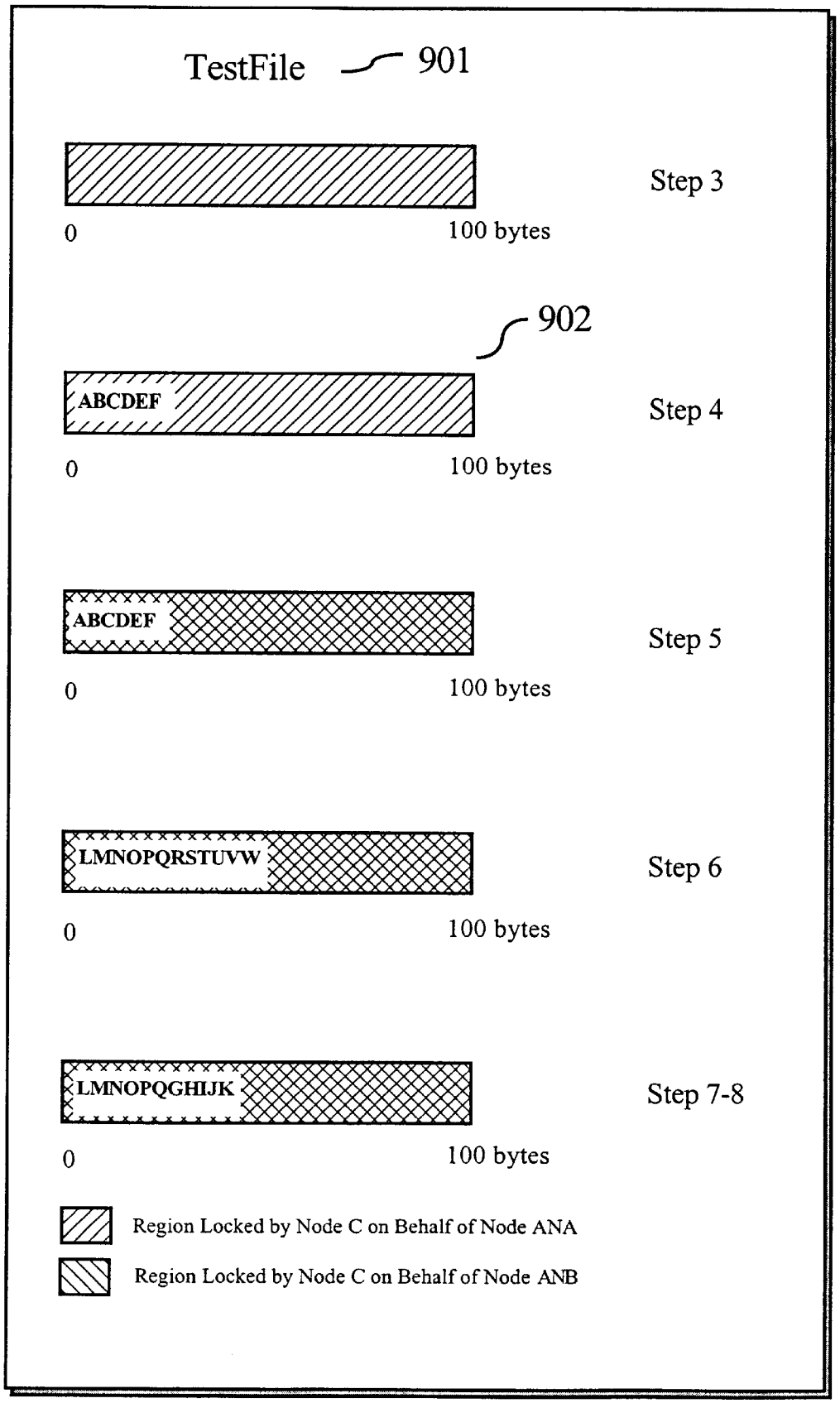
FIG. 9 illustrates steps that may occur when a file is corrupted.

In this example illustrated in FIG. 9, an Application on Node A (ANA) running DDS attempts to write the character string 'ABCDEFGHIJK' to a file TestFile 901 on Node C. An Application on Node B (ANB) then attempts to write the string 'LMNOPQRSTUVW' to the same file. Steps 3–8 are graphically shown in FIG. 9 and explained in the following the steps illustrate how a file may be corrupted.

In step 1, ANA requests that file TestFile 901 be opened on Node C. Node C services the request from Node A and returns file handle CA for ANA to use.

In step 2, ANB requests that file TestFile 901 be opened on Node C. Node C services the request from Node B and returns file handle CB for ANB to use.

In step 3, ANA performs an exclusive lock, for example, on the region 902 (e.g., 0 to 100 bytes) of Test File 901 using file handle CA. Node C services the request from Node A and also locks the same file region 902

In step 4, ANA attempts to write the string 'ABCDEFGHIJK' to the Test File 901 using handle CA. Before the write has completed, the operating system on Node C "swaps out the thread" (switches temporarily, for example to a higher priority process) performing the write and the string 'ABCDEF' is written to the Test File 901.

In step 5, ANB also performs an exclusive lock on the region 902 (e.g., 0 to 100 bytes) using file handle CB. Because the same process on Node C services the file request, the lock operation is successful and ANB is under the incorrect assumption that no other application is modifying the Test File 901.

In step 6, ANB attempts to write the string 'LMNOPQRSTUVW' to the file using handle CB. This write completes and the string 'LMNOPQRSTUVW' is written to the file. The 'LMNOPQ' part of the string overlays what ANA previously wrote to the Test File 901.

In step 7, the OS on Node C "swaps in the thread" (resumes an interrupted process) processing the write request for ANA and this thread completes the remainder of the interrupted write that occurred in step 4.

In step 8, TestFile 901 now has a value of 'LMNOPQGHIJKW' instead of 'LMNOPQRSTUVW' resulting in a corrupted file.

If the exclusive file locks were respected, then the attempt to lock the file region by Node C on behalf of ANB (step 5) should fail. ANB can then attempt a retry of writing string 'LMNOPQRSTUVW' at a later time once the file lock is successfully obtained. This would prevent the file corruption caused by having parts of each string written to the file.

Non-Serializable Operations Error Example

Figure 10:
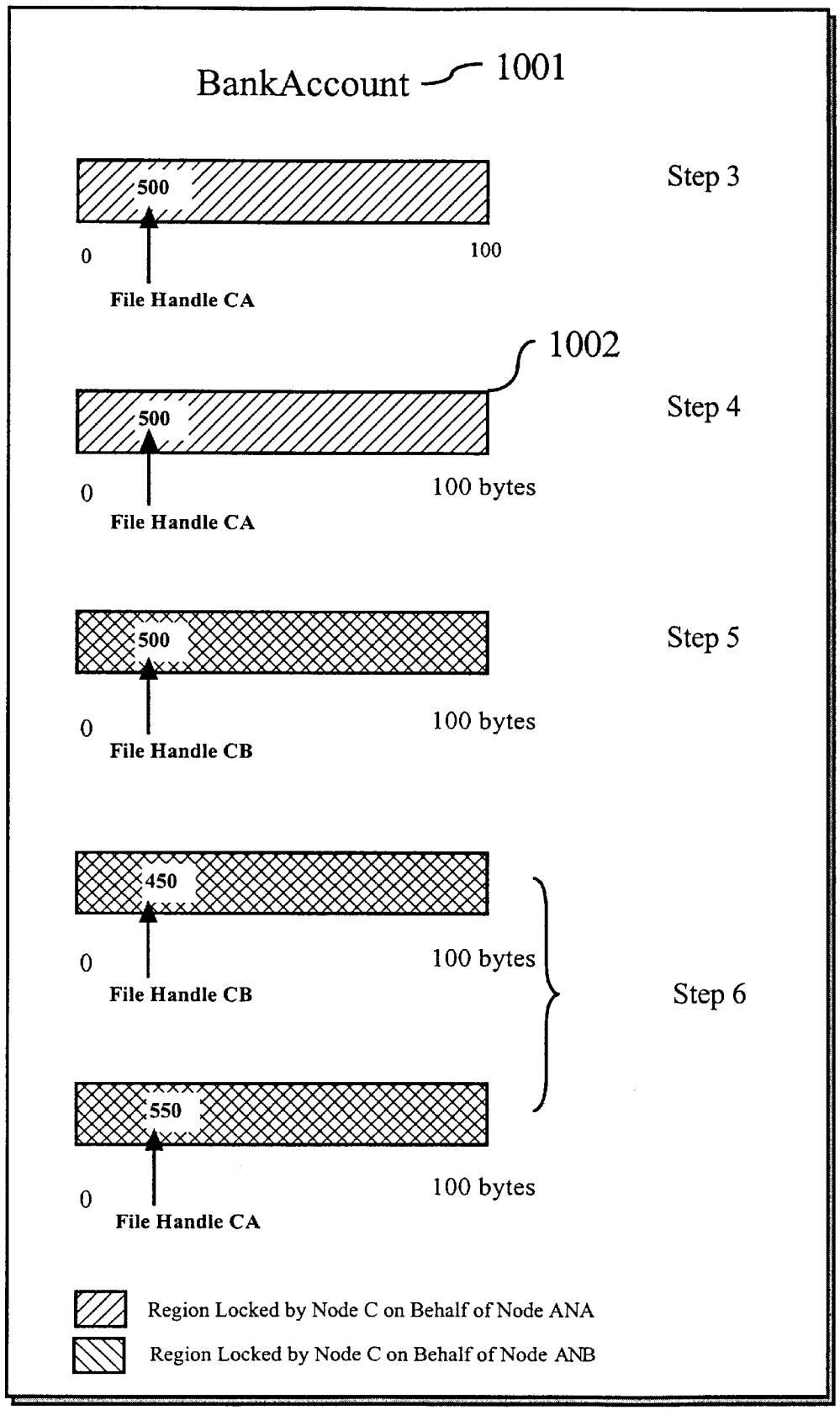
FIG. 10 illustrates steps that may occur when a file experiences serialization errors.

FIG. 10 illustrates an example where an Application on Node A (ANA) running DDS attempts to add $50 to the total amount stored in an exemplary file BankAccount 1001 on Node C. An application on Node B (ANB) then attempts to subtract $50 from the total amount in the same file BankAccount 1001 on Node C. Initially there is a balance of $500 in the BankAccount 1001 file. Steps 3–6 are illustrated graphically in FIG. 10. Steps 1 and 2 are not shown graphically in FIG. 10.

In step 1, ANA requests that file BankAccount 1001 be opened on Node C. Node C services the request from Node A and returns file handle CA for ANA to use.

In step 2, ANB requests that file BankAccount 1001 be opened on Node C. Node C services the request from Node B and returns file handle CB for ANB to use.

In step 3, ANA performs an exclusive lock on file region 1002 (e.g., 0 to 100 bytes) using file handle CA. Node C services the request from Node A and locks file region 1002.

In step 4, ANA reads the data from file region 1002 using file handle CA. The value of $500 is read in by Node C and returned to ANA.

In step 5, ANB also performs an exclusive lock on file region 1002 (e.g., 0 to 100 bytes) using file handle CB. Because the same process on Node C services the lock request, the lock operation is successful. ANB is under the incorrect assumption that no other application is modifying this file. ANB reads the data from file region 1002 using file handle CB and retrieves the value of $500 returned by Node C.

In step 6, ANA then attempts to add $50 to that total. Before the write to update that data in the file can be completed, ANB writes a data value of $450 back to the file using handle CB. ANA then writes a data value of $550 to the file using handle CA. Node C first services the file request from ANB, then ANA. The final amount in the BankAccount 1001 file is $550, instead of a correct value of $500 resulting in a serialization error.

If the exclusive file locks were respected, then the attempt to lock the file region by Node C on behalf of ANB should fail. ANB can then attempt a retry of subtracting $50 from the BankAccount 1001 file at a later time once it successfully obtains the file lock. This would enforce the serial file operation rules and result in a correct final amount of $500 in the BankAccount 1001 file.

To solve the above problems on the AIX operating system, embodiments of the present invention use a File Lock Emulator with a three level software structure. The three software levels used in embodiments of the present invention are listed below:

(1) Application Program Interface (API)
(2) File Lock Supervisor
(3) File Lock Manager File Lock Manager A File Lock Manager, in embodiments of the present invention is, the lowest level software or the software level closest to the Operation System (OS). File Lock Managers are generated for each file created or opened by Application programs. Whenever a successful lock is requested on a file, information about the lock is added into this File Lock Manager. The File Locking Supervisor uses a file handle passed into the application and a unique file number to determine which File Lock Manager, within its list of File Lock Managers, should be checked to ensure a file operation is valid. On AIX, for example, the OS function "fstat( )" will return the device number and device node for a given file handle. Adding these numbers together produces a unique number that will be the same for any file handle opened on the same file. This number is stored away in each of the File Lock Managers. When an operation comes into the File Locking Supervisor, the unique number of the file handle passed in by the application is then compared to the unique number stored in each of the File Lock Managers in order to find the correct one (if it exists).

The following is a sample header file from an exemplary File Lock Manager written in C++ script code and used in embodiments of the present invention.

```
struct FileLockInfo
{
  enum LockOperation
    {
    LOCK_EXCLUSIVE,
    LOCK_SHARED,
    LOCK_ATOMIC_EXCLUSIVE,
    LOCK_ATOMIC_SHARED,
    UNLOCK,
```

-continued

```
    UNLOCK_ALL
    };
  enum FileOperation
    {
    TRUNCATE_OPERATTON,
    READ OPERATION,
    WRITE_OPERATION
    };
  ...
  const int       FileHandle;
  const LockOperation LockType;
  const unsigned long Offset;
  const unsigned long Range;
  };
class File Lock Manager
  {
  friend class File Lock Supervisor;
  public:
    File Lock Manager (unsigned long uniqueFileNumber);
    unsigned long GetUniqueNumber {return UniqueFileNumber;}
    long PerformOperation (int FileHandle,
                           FileLockInfo::LockOperation lockType,
                           unsigned long Offset,
                           unsigned long Range);
    ...
  private:
    long CheckLocked (int FileHandle,
                      FileLockInfo::FileOperation fileOperation,
                      unsigned long Offset,
                      unsigned long Range,
                      BOOL &isConflicting);
  long FileLockManager:: CheckValidOperation
                      (int FileHandle,
                      FileLockInfo::LockOperaton,
                      unsigned long Offset,
                      unsigned long Range);
    BOOL InsertLockInfo (int FileHandle,
                         FileLockInfo:LockOperation lockType,
                         unsigned long Offset,
                         unsigned long Range);
    BOOL RemoveLockInfo (int FileHandle,
                         FileLockInfo::LockOperation lockType,
                         unsigned long Offset,
                         unsigned long Range);
    unsigned long UniqueFileNumber;
  FileLockInfo .  LockInfo;
  ...
  };
```

In embodiments of the present invention, all the lock information about a file is stored using the File Lock Manager which essentially allows emulation of any file locking behavior. Using emulation, lock functions may be respected by file handles rather than by processes. In embodiments of the present invention inplemented on the Application program DDS, this behavior is coded in the File Lock Manager in two functions: the CheckLocked function for read, write, and truncate operations and the CheckValidOperation function for lock and unlock operations. The steps used in embodiments of the present invention to implement this behavior are listed in Table 1 and Table 2.

TABLE 1

| File Lock Manager::CheckLocked Function | |
|---|---|
| File Operation Type | Implementation Steps (the isConflicting flag is false by default) |
| Read | 1. Traverse all the locks currently on the file. 2. If there are any exclusive locks from another file handle that overlap the file region that the application is reading from, then |

TABLE 1-continued

File Lock Manager::CheckLocked Function

| File Operation Type | Implementation Steps (the isConflicting flag is false by default) |
|---|---|
| Write | set the isConflicting flag to true.<br>1. Traverse all the locks currently on the file.<br>2. If there are any shared locks from any file handle that overlap the file region that the application is writing to, then set the isConflicting flag to true.<br>3. If there are any exclusive locks from another file handle that overlap the file region that the application is writing to, then set the isConflicting flag to true. |
| Truncate | 1. Traverse all the locks currently on the file.<br>2. If there are any locks from any file handle that overlap the file region that the application is truncating, then set the isConflicting flag to true. |

TABLE 2

File Lock Manager::CheckValid Operation function

| File Lock Type | Implementation Steps |
|---|---|
| Unlock | 1. Traverse all locks currently on the file.<br>2. If there is no lock on the file for the same offset and range, then return an access error.<br>3. Perform the OS file unlock call. If the call is successful, then call the File Lock Manager::RemoveLockInfo function to remove this lock information.<br>4. Pass back the return code from performing the OS file unlock call. |
| Exclusive | 1. Traverse all locks currently on the file.<br>2. If there are any locks that overlap the file region that the application is attempting to lock, then return an access error.<br>3. Perform the OS file exclusive lock call. If the call is successful, then call the File Lock Manager::InsertLockInfo function to insert this new lock information into the File Lock Manager.<br>4. Pass back the return code from performing the OS file exclusive lock call. |
| Shared Atomic | 1. Traverse all locks currently on the file.<br>2. If there is no exclusive lock on the file for the same file handle, same offset, and same range, then return an access error.<br>3. Perform the OS file shared atomic lock call. If the call is successful, then call the File Lock Manager::RemoveLockInfo function and then the File Lock Manager::InsertLockInfo to remove the old lock information and insert the new updated information into the File Lock Manager.<br>4. Pass back the return code from performing the OS file shared atomic lock call. |
| Exclusive Atomic | 1. Traverse all locks currently on the file.<br>2. If there is more than one shared lock on the file for the same file handle, same offset, and same range, then return an access error.<br>3. Perform the OS file exclusive atomic lock call. If the call is successful, then call the File Lock Manager::RemoveLockInfo function and then the File Lock Manager::InsertLockInfo function to remove the old lock information and insert this new updated information into the File Lock Manager.<br>4. Pass back the return code from performing the OS file exclusive atomic lock call. |
| Shared | 1. Traverse all locks currently on the file<br>2. If there are any exclusive locks that overlap the file region that the application is attempting to lock, then return an access error.<br>3. Perform the OS file shared lock call. If the call is successful, ten call the File Lock Manage5r::Insert-LockInfo function to inset this new lock information into the file lock manager.<br>4. Pass back the return code from performing the OS file shared lock call |

The File Locking Supervisor

All File Locking Managers are then stored by a file locking supervisor which makes up the middle software layer. For DDS, this File Lock Supervisor is created at startup for the process that services the local and remote file requests. The functions provided by the File Lock Supervisor are wrapper functions that determine which lock manager to use to validate a file operation. Each function eventually ends up either calling the CheckLocked or PerformOperation function provided by the File Lock Manager. The PerformOperation function tells the OS to execute a process (e.g., read, write, etc.). Any file operation that adds, removes, or checks on the locks is explicitly performed by the File Lock Manager on behalf of the File Lock Supervisor. Below is a sample header file of the File Lock Supervisor class created by DDS at startup time.

The following C/C++ script code is used in embodiments of the present invention with the Application program DDS:

```
class File Lock Supervisor
{
public:
    File Lock Supervisor ( );
    long isReadable (int FileHandle, unsigned long Offset,
                unsigned long Range, BOOL &isConflicting);
    long isTruncateOkay (int FileHandle, unsigned long Offset,
                unsigned long Range, BOOL
&isConflicting);
    long isWritable (int FileHandle, unsigned long Offset,
                unsigned long Range, BOOL &isConflicting);
    long LockExclusive (int FileHandle, unsigned long Offset,
                unsigned long Range, BOOL lockAtomic);
    long LockShared (int FileHandle, unsigned long Offset,
                unsigned long Range, BOOL lockAtomic);
        tl,1     long Unlock (int FileHandle, unsigned long
                Offset,
            unsigned long Range);
    . . .
private:
    File Lock Manager . hashSlot[TOTAL_HASHTABLE_SLOTS];
    . . .
};
extern File Lock Supervisor flSupervisor;
```

Definitions for the arguments in each of the function calls in the File Lock Manager and the File Lock Supervisor are listed in Table 3.

TABLE 3

Definition of function arguments

| Function Argument | Definition |
|---|---|
| FileHandle | Reference to a file returned from the operating system when a file is opened or created. |
| Offset | The number of bytes from the beginning of the file where the operation should be performed. |

TABLE 3-continued

Definition of function arguments

| Function Argument | Definition |
|---|---|
| Range | The number of bytes the operation should be performed. |
| isConflicting | Whether there is a file lock currently on the file that will prevent the operation. |
| lockAtomic | Whether an existing lock should be converted to another lock in one step. |

The DDS Application Programming Interface (API)

The top software layer is the Application Programming Interface (API) and is used by applications requiring a special non-AIX file locking behavior. This layer hides the fact that there is a File Locking Supervisor or File Lock Manager and allows current applications written in C/C++ on the UNIX platform to invoke a modified set of file operations instead of the standard UNIX file OS calls. Threads spawned from the DDS process servicing file requests also use this interface. Table 4 lists the extra steps that these modified file calls take to ensure a file operation is valid and the locking problem they prevent:

TABLE 4

DDS API implementation

| DDS API's | Implementation Steps |
|---|---|
| FdsReadFile (read operation) Prevents Problem #1, Case 1.3 | 1. Make the File Lock Supervisor::isReadable call.<br>2. If the isConflicting boolean returns a TRUE, then return an access error to the calling application.<br>3. Otherwise, perform the read using the standard OS calls. |
| FdsTruncateFile (truncate operation) Prevents Problem #1, Case 1.3 and Problem #2, Case 2.3. | 1. Make the File Lock Supervisor::isTruncateOkay call.<br>2. If the isConflicting boolean returns a value of TRUE, then return an access error to the calling application.<br>3. Otherwise, perform the truncate operation using the standard OS calls. |
| FdsWriteFile (write operation) Prevents Problem #1, Case 1.3 and Problem #2, Case 2.3 | 1. Make the File Lock Supervisor::isWritable call.<br>2. If the isConflicting boolean returns a value of TRUE, then return an access error to the calling application.<br>3. Otherwise, perform the write using the standard OS calls. |
| FdsLockFile (exclusive lock operation) Prevents Problem #1 (Case 1.1–1.2) | 1. Make the File Lock Supervisor::LockExclusive call.<br>2. Pass the return code back to the calling application. |
| FdsLockFile (shared lock operation) Prevents Problem #2 (Case 2.1–2.2) | 1. Make the File Lock Supervisor::LockShared call.<br>2. Pass the return code back to the calling application. |
| FdsUnlockFile (unlock operation) Prevents Problem #3 (Case 3.1–3.2) | 1. Make the File Lock Supervisor::Unlock call.<br>2. Pass the return code back to the calling application. |

Achieving File Locking Independence

Figure 6:
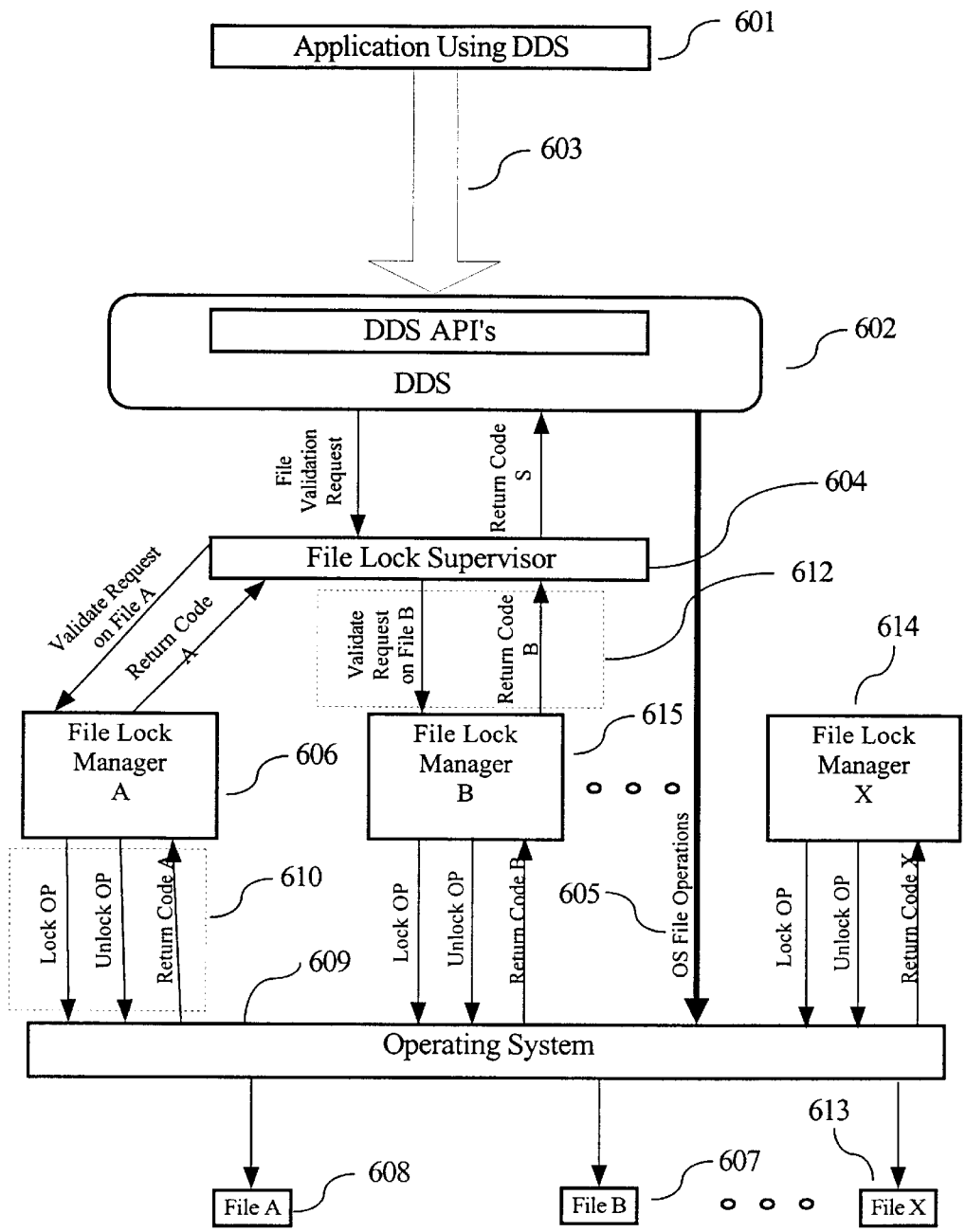
FIG. 6 is a diagram of a complete system for a DDS Application according to embodiments of the present invention.

The overall 3-layer software solution comprises the DDS API's 602, the File Lock Supervisor 604, and the File Lock Managers 606, 615, 614 as shown in FIG. 6. Through the use of the DDS API's 602, applications using DDS and the DDS file request process are not required to be aware of the possible locking behavior differences when running on different OS platforms. If the OS provides the required locking behavior, then the File Locking Supervisor 604 and File Lock Manager layers may be removed. If the behavior is different, then instead of modifying all applications using DDS, only the File Locking Supervisor and the File Lock Manager code need to be altered. This software solution has been shown specifically for applications using the DDS product, but it can be readily implemented for any application. The File Lock Supervisor 604 and File Lock Manager 606, 614, 615 comprise common code that may be reused so only a new API layer, that performs the same function as the one shown in Table 4, needs to be created.

Figure 2:
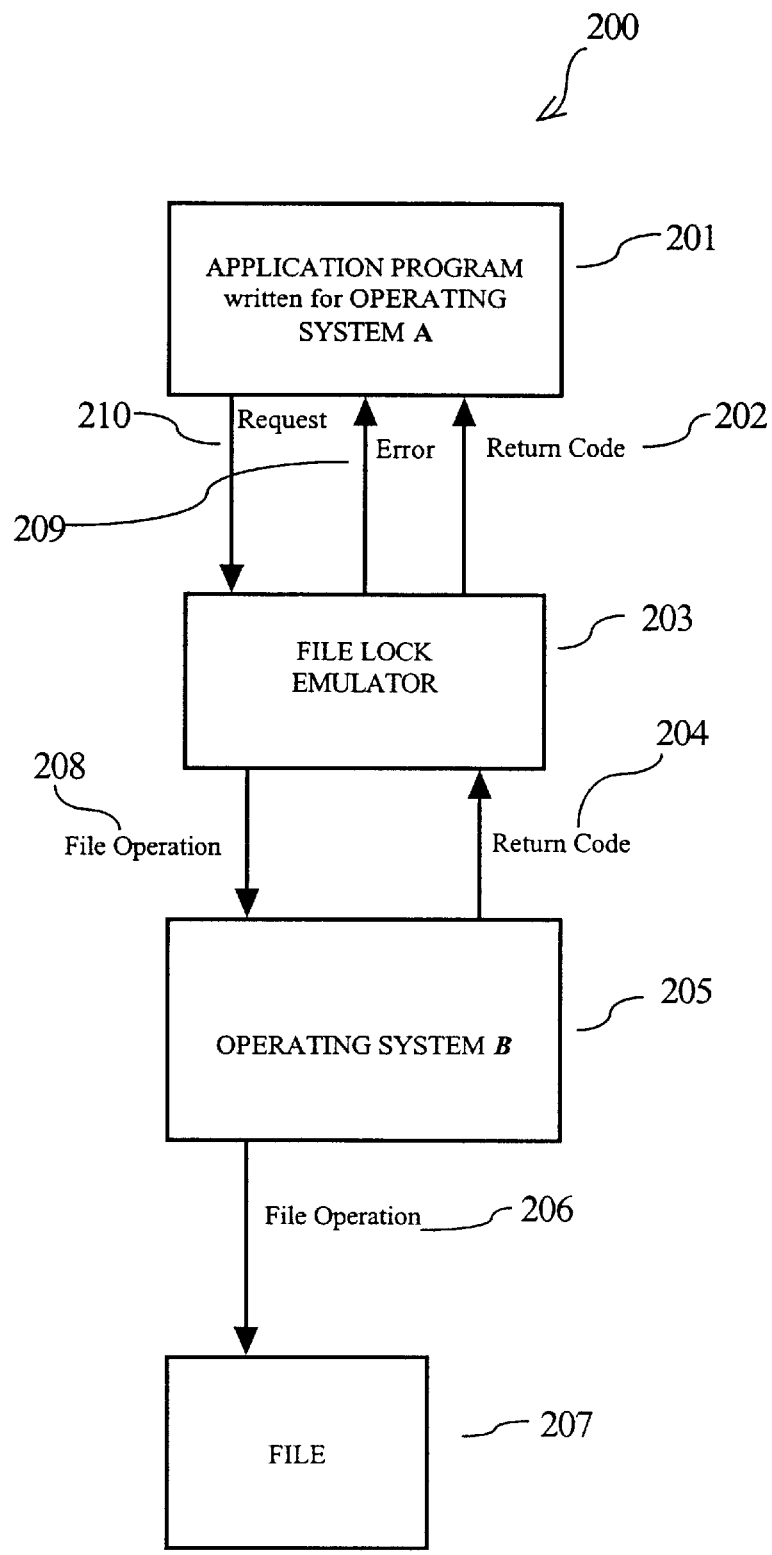
FIG. 2 illustrates an embodiment of the present invention where a file lock emulation manager is inserted between an Application program and an OS.

FIG. 1 illustrates prior art communication between an Application program DDS 101 and the IBM AIX Operating System 104 executing File Operation 105 on an exemplary File 106. Request for an operation, via Request 103, is serviced by OS 104 and Return Code 103 signals to Application 101 status of in process or completed operations FIG. 2 illustrates embodiments of the present invention. In this example an application program 201, written for an OS A platform, has been ported to run on OS B 205. In this example, a File Lock Emulator 203, employed in embodiments of the present invention, is used to interface between the application program 201 and OS B 205. The File Lock Emulator 203 operates to pass only compatible requests from the application program 201 to OS B 205. Incompatible requests result in the File Lock Emulator 203 returning an error 209 which may contain instructions on appropriate action for a user to take. A valid request 210 will result in a file operation request 208 being sent to operating system B 205 and a file operation 206 will be executed on exemplary file 207. Operating system B 205 will send return code 204 via File Lock Emulator 203 resulting in return code 202 being sent to the application program 201. Return codes 202 and 204 comprise status results of a request 201. If the application program 201 is ported to an operating system different from operating system 205, then only the file lock emulation 203 need be rewritten. This keeps the integrity of tested code in the application program 201 when it is ported to different operating systems.

FIG. 5 is an illustration of two nodes (computers systems), Node A 501 and Node B 502, running application programs DDS 503 and DDS 509, respectively. Exemplary files, File A 505, File B 506, File C 507 and File D 508 may be acted upon by either node. FIG. 5 illustrates exemplary requests 512 (write to File B by Node B) and 513 (read of File C by Node A). DDS file request processes are illustrated as running on both nodes.

FIG. 6 illustrates embodiments of the present invention in which File Lock Emulator 203 comprises the DDS API's 602, the File Lock Supervisor 604, along with an exemplary File Lock Manager A 606. In this illustration, actual Operating System (OS) File Operations 605 go from a DDS API 602 directly to the OS 609, whereas File Lock information goes from the Application 601 via DDS API 602 to the File Lock Supervisor 604 and then to an exemplary File Lock Manager A 615. Before an actual request is executed (via OS File Operation 605 ) DDS API 602 intercepts the normal Application call and creates a new call hidden from the user of the application. The DDS API 602 issues lock routines, for example, via the File Lock Supervisor 604 to determine if there is a compatibility issue. Depending on which file of exemplary files File A 608, File B 607 or File X 613 is being acted upon, the File Lock Supervisor 604 will query the appropriate File Lock Manager (FLM) (in this illustration, FLM 606, 614, or 614 ) which in turn will execute appropriate lock routines. Return code from the OS 609, FLM 606, and File Lock Supervisor 604 will determine whether an actual OS File Operation 605 may be consummated.

Figure 7:
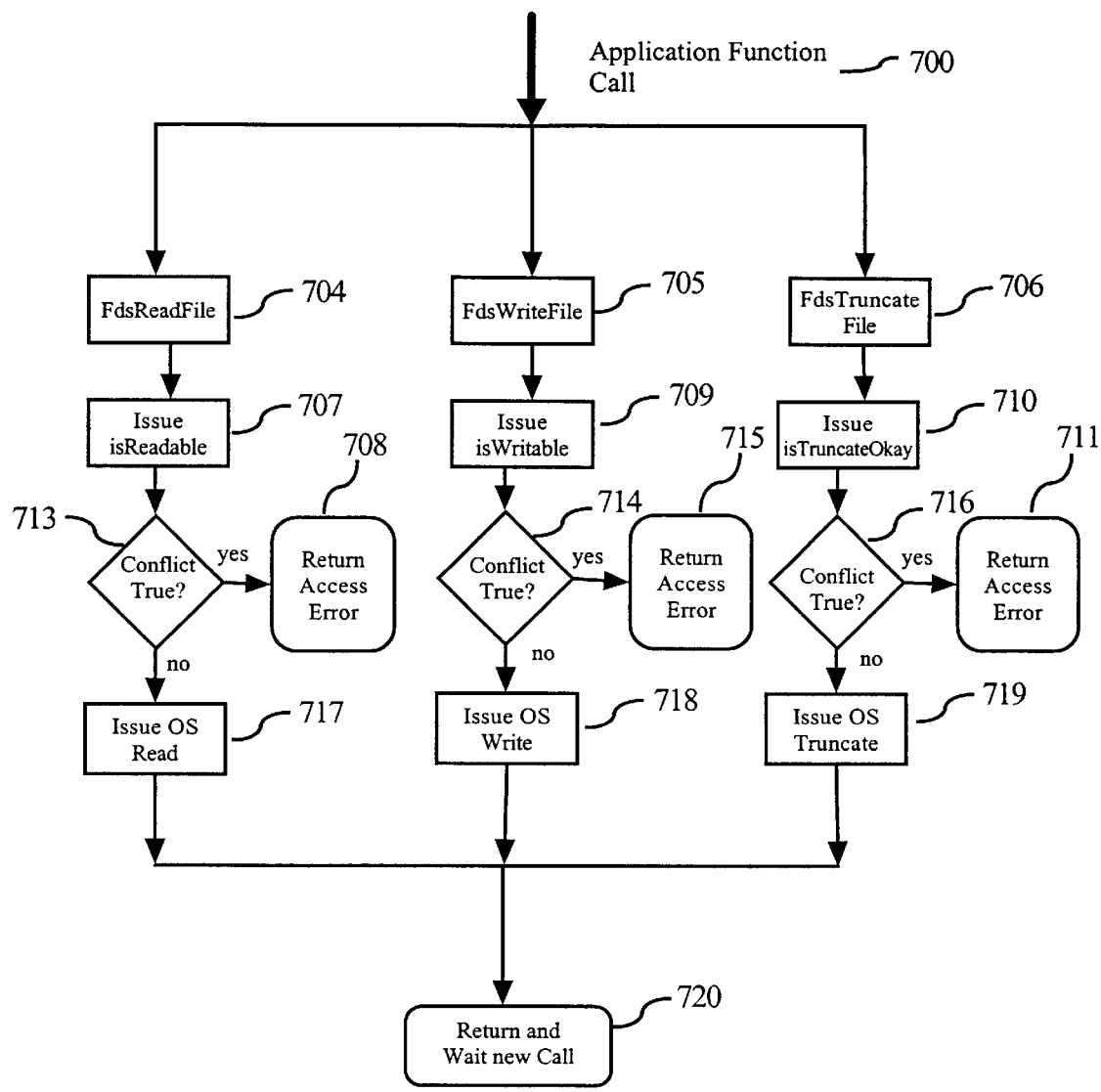
FIG. 7 is a flow diagram of steps in embodiments of the present invention when an Application program issues read, write, and truncate file function calls.
Figure 8:
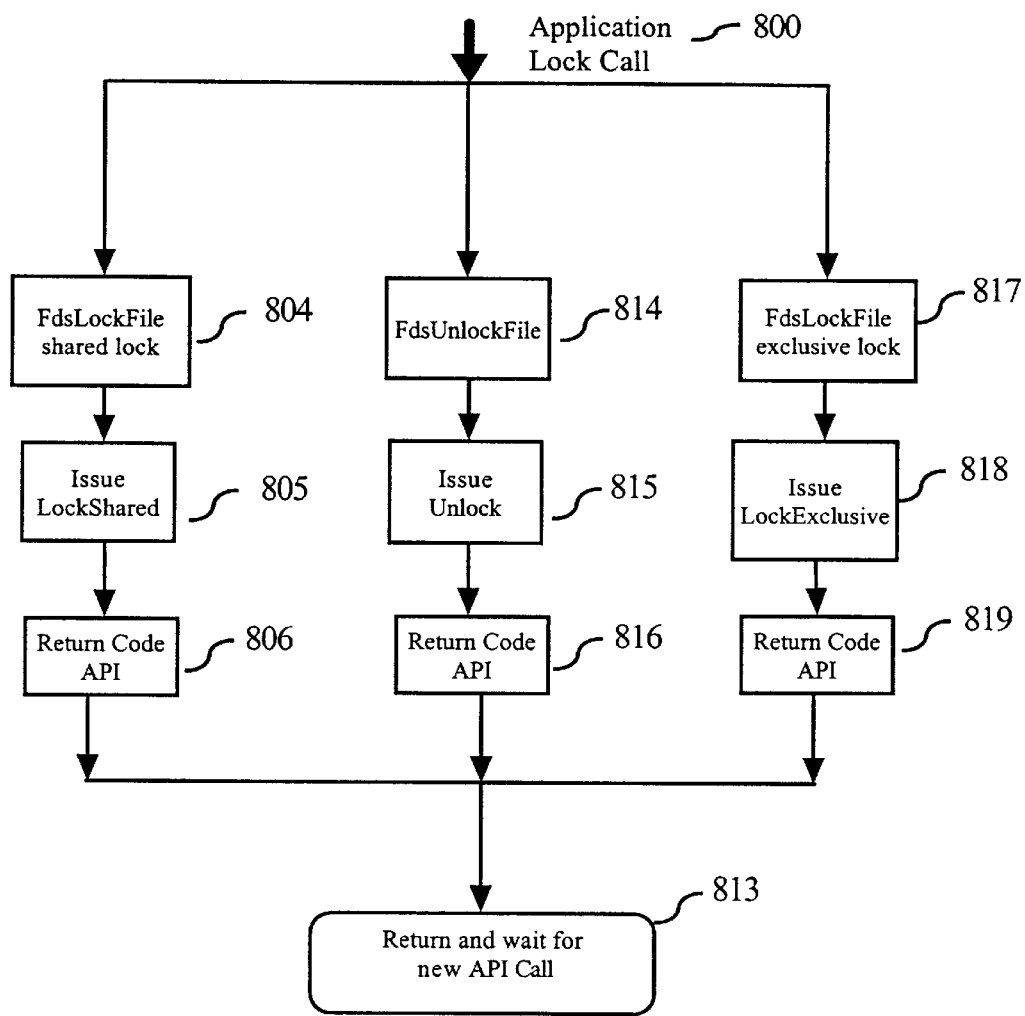
FIG. 8 is a flow diagram of steps in embodiments of the present invention when an Application program issues lock file calls.

Embodiments of the present invention store all the lock information about a file in a File Lock Manager element of the File Lock Emulator comprising an API, FLM and a FLS. This allows any file locking behavior desired to be emulated. Embodiments of the present invention may direct that locks be respected by the lock handles rather than by processes. This functionality is coded in File Lock Manager functions. Exemplary functions (for a DDS application) would be a CheckLocked function for read, write and truncate operations and a CheckValidOperation function for lock and unlock operations. FIG. 7 and FIG. 8 illustrate steps used in embodiments of the present invention in implementing a CheckLocked and a CheckValidOperation function.

FIG. 7 illustrates steps, in embodiments of the present invention, used when an application issues operation calls to an OS. The Application function calls 700, in FIG. 7, are either a FdsReadFile in step 704, FdsWriteFile in step 705 or a FdsTruncateFile in step 706. In step 704, the FdsReadFile command sends a validate request to the File Lock Supervisor. The validate request goes to the File Manager with the query in step 707 as to whether the file requested is readable (isReadable call). The file requested is readable unless another file handle has an exclusive lock on this read region. Step 713 tests whether a conflict exists. If a conflict exists, a Return Access Error is issued in step 708. If there is not a conflict in step 713, then the OS is directed via the API to do a normal read in step 717 and a return is issued in step 720 to await a new application call. In step 705, the Application program issues FdsWriteFile which results in a query whether the requested file is writeable in step 709. A test for conflict is done in step 714. If a conflict exists, a Return Access error is issued in step 715. If no conflict exists, a normal OS File write is issued in step 718 followed by a return and a wait for another Application call in step 720. A FdsTruncate File in step 706 results in a query as to whether a File Truncate is executable (isTruncate Okay) in step 710. A conflict test is done in step 716 and if a conflict exists a Return Access error is issued in step 711. If no conflict exists, an OS Truncate File is issued in step 719 followed by a Return awaiting a new call in step 720.

FIG. 8 illustrates Application program Lock calls 800. The API is programmed for the particular Application and OS so that incompatible lock operations will not cause files to be corrupted. If an Application issues an incompatible lock operation, the API will signal the Application with an error. Otherwise the API will make the necessary emulations so Application requests are properly converted and sent to the OS via the File Lock Supervisor and a File Lock Manager. In step 804, a FdsLockFile shared lock is issued by an Application. LockShared is issued in step 805. Code is returned to the API in step 806 indicating the results of the operation. A return is issued to wait for an new Application call in step 813. In step 814, FdsUnlockFile is issued by an Application and an Unlock is issued in step 815. Code is returned to the API in step 816 indicating the results of the operation. A return is issued to wait for an new Application call in step 813. In step 817, an FdsLockFile exclusive lock is issued by an Application and LockExclusive is issued in step 818. Code is returned to the API in step 819 indicating the results of the operation. A return is issued to wait for an new Application call in step 813

Figure 4:
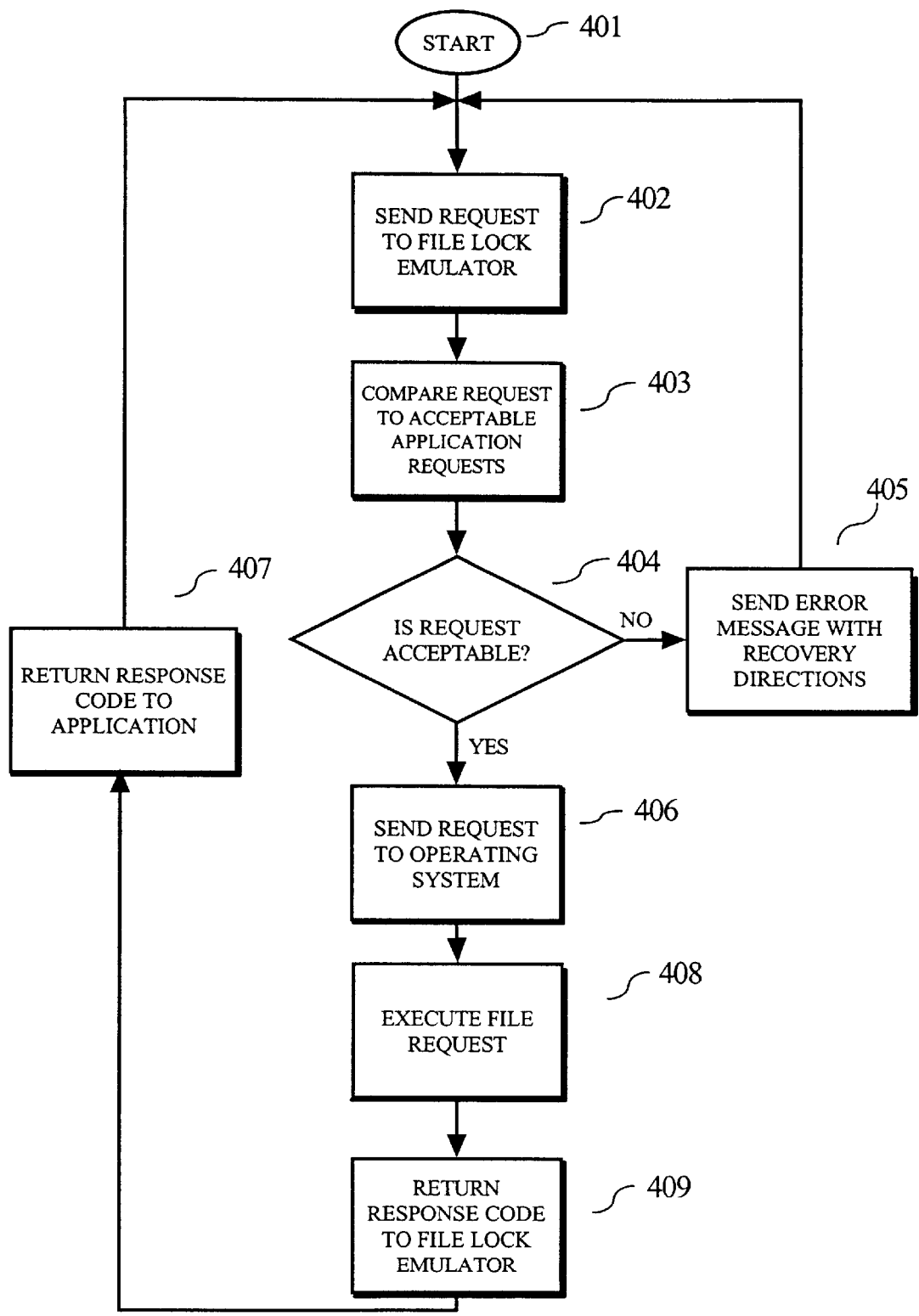
FIG. 4 is a flow diagram of method steps in embodiments of the present invention.

FIG. 4 is a flow diagram of the general steps of a File Lock Emulator employed in embodiments of the present invention. FIG. 4 is not directed to a particular Application request but illustrates overall File Lock Emulator actions. Step 401 illustrates entry into a File Lock Emulator. In step 402, a request is sent to the File Lock Emulator. In step 403, the request is compared to determine if it is an acceptable or compatible request between an application program and the operating system where it has been ported. In step 404, an unacceptable request results in a branch to step 405 where an error message including possible recovery options is returned to the application program. Step 405 also branches back to step 402 allowing a wait for another request. An acceptable request in step 402 branches to step 406 where the request is sent to the operating system. An acceptable file request is executed in step 408. A return status response of the file operation is sent to the File Lock Emulator in step 409 and a corresponding return code is sent to the application program in step 407. Step 407 also returns to step 402 awaiting further file lock management requests.

Figure 3:
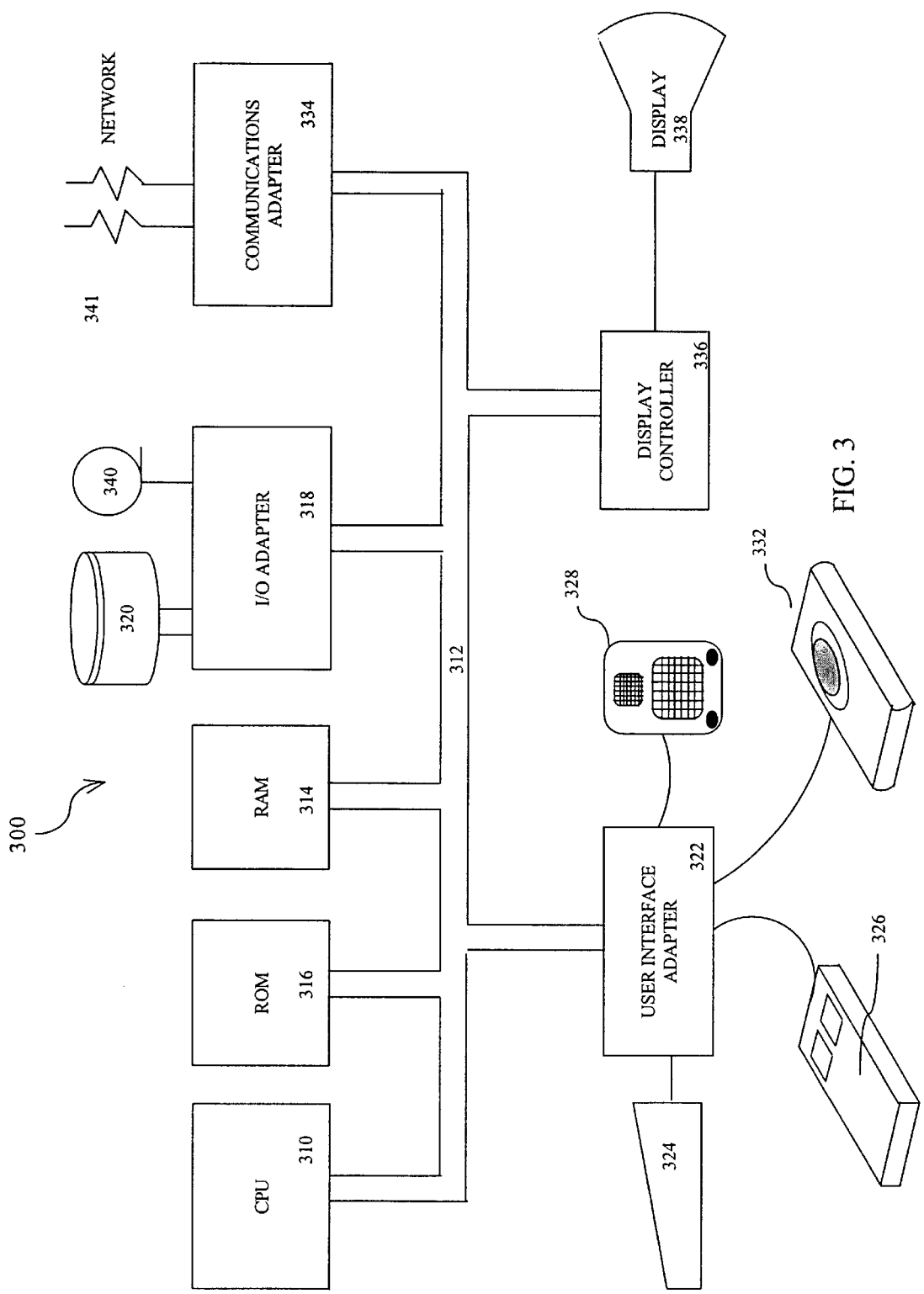
FIG. 3 is a block diagram of a data processing system for use with embodiments of the present invention.

Referring to FIG. 3, an example is shown of a data processing system 300 which may be used for the invention. The system has a central processing unit (CPU) 310, which is coupled to various other components by system bus 312. Read-only memory ("ROM") 316 is coupled to the system bus 312 and includes a basic input/output system ("BIOS") that controls certain basic functions of the data processing system 300. Random access memory ("RAM") 314, 110 adapter 318, and communications adapter 334 are also coupled to the system bus 312. 10 adapter 318 may be a small computer system interface ("SCSI") adapter that communicates with a disk storage device 320. Communications adapter 334 interconnects bus 312 with an outside network enabling the data processing system to communicate with other such systems. Input/Output devices are also connected to system bus 312 via user interface adapter 322 and display adapter 336. Keyboard 324, track ball 332, mouse 326 and speaker 328 are all interconnected to bus 312 via user interface adapter 322. Display monitor 338 is connected to system bus 312 by display adapter 336. In this manner, a user is capable of inputting to the system throughout the keyboard 324, trackball 332 or mouse 326 and receiving output from the system via speaker 328 and display 338.

Preferred implementations of the invention include implementations as a computer system programmed to execute the method or methods described herein, and as a computer program product. According to the computer system implementation, sets of instructions for executing the method or methods are resident in the random access memory 314 of one or more computer systems configured generally as described above. Until required by the computer system, the set of instructions may be stored as a computer program product in another computer memory, for example, in disk drive 320 (which may include a removable memory such as an optical disk or floppy disk for eventual use in the disk drive 320 ). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, system operations processing electrical signals to generate other electrical signals.

Although the present invention and its advantages have been described in detail, it should be understood that various changes, substitutions and alterations can be made herein without departing from the spirit and scope of the invention as defined by the appended claims.

What is claimed is:

1. A method of managing process requests between an application program and an operating system comprising the steps of:

sending application program file requests from said application program to a file request emulator, said file request emulator comprising an application program interface and a file lock supervisor;

converting said application program file requests to a set of compatible operating system file requests and file lock query commands;

creating file lock managers by said file lock supervisor for each file accessed by said operating system;

storing file lock information about each of said accessed files in a corresponding one of said file lock managers;

checking the validity of application program file requests in said file lock supervisor; and sending compatible application program file requests to said operating system for execution.

2. The method of claim 1, wherein an error statement is returned to said application program from said file request emulator if said application program file request is an incompatible file request.

3. The method of claim 1, wherein only said file request emulator need be modified when said application program is ported to different operating systems with which said application program shares incompatible but executable file requests.

4. The method of claim 1, wherein said application program file requests comprise a file read, write, truncate, unlock, lock shared, lock exclusive, lock atomic, and lock exclusive atomic.

5. The method of claim 1, wherein said file lock query commands assess whether a file is locked, locked shared or locked exclusive.

6. The method of claim 2, wherein said error statement includes a recovery action available to a user of said application program.

7. A computer program product embodied in a machine readable medium, including programming for a computer system, comprising a program of instructions for performing the method steps of:

sending application program file requests from an application program to a file request emulator, said file request emulator comprising an application program interface and a file lock supervisor;

converting said application program file requests to a set of compatible operating system file requests and file lock query commands;

creating file lock managers by said file lock supervisor for each file accessed by said operating system;

storing file lock information about each of said accessed files in a corresponding one of said file lock managers;

checking the validity of application program file requests in said file lock supervisor; and sending compatible application program application program file requests to said operating system for execution.

8. The computer program product of claim 7, wherein an error statement is returned to said application program from said file request emulator if said process request is an incompatible process request.

9. The computer program product of claim 7, wherein only said file request emulator need be modified when said application program is ported to different operating systems with which said application program shares incompatible but executable processes.

10. The computer program product of claim 7, wherein said application program file requests comprise a file read, write, truncate, unlock, lock shared, lock exclusive, lock atomic, and lock exclusive atomic.

11. The computer program product of claim 7, wherein said file lock query commands assess whether a file is locked, locked shared or locked exclusive.

12. The computer program product of claim 8, wherein said error statement includes a recovery action available to a user of said application program.

13. A system for managing process requests between an application program and an operating system program comprising:

a file request circuit operable for sending application program file request commands from said application program to a file request emulator; said file request emulator comprising application program interface circuits and file lock supervisor circuits;

a file request conversion circuit operable for receiving said application program file request commands and converting said application program file request commands to a set of compatible operating system file request commands and file lock query commands;

programmable file lock manager circuits operable to be programmed by said file lock supervisor to create file lock managers for each file accessed by said operating system;

file lock storage circuits in each of said file lock managers operable to store the file lock status of each of said accessed files in a corresponding one of said file lock managers;

a file request validity circuit in said file lock supervisor circuit operable to compare each of said application program file requests to a set of compatible requests; and a sending circuit operable for sending compatible application program file request commands to said operating system for execution.

14. The system of claim 13, further comprising an error circuit operable for returning error conditions if said process request is an incompatible process request.

15. The system of claim 13, wherein only said programmable file request emulator has to be modified when said application program is ported to different operating systems with which said application program shares incompatible but executable processes.

16. The system of claim 13 wherein said application program file request commands comprise file read, write, truncate, unlock, lock shared, lock exclusive, lock atomic, and lock exclusive atomic commands.

17. The system of claim 13 wherein said file lock query commands assess whether a file is locked, locked shared or locked exclusive.

18. The system of claim 13 wherein error notification includes a recovery action options available to a user of said application program.

19. A data processing system, comprising:
a central processing unit (CPU);
shared random access memory (RAM);
read only memory (ROM);
an I/O adapter; and
a bus system coupling said CPU to said ROM, said RAM said display adapter,
wherein said CPU further comprises:
- a file request circuit operable for sending application program file request commands from an application program to a file request emulator, said file request emulator comprising application program interface circuits and a file lock supervisor circuits;
- a file request conversion circuit operable for receiving said application program file request commands and converting said application program file request commands to a set of compatible operating system file request commands and file lock query commands;
- programmable file lock manager circuits operable to be programmed by said file lock supervisor to create file lock managers for each file accessed by an operating system;
- file lock storage circuits in each of said file lock managers operable to store the file lock status of each of said accessed files in a corresponding one of said file lock managers;
- a file request validity circuit in said file lock supervisor circuit operable to compare each of said application program file requests to a set of compatible requests; and
- a sending circuit operable for sending compatible application program file request commands to said operating system for execution.

20. The data processing system of claim 19, further comprising an error circuit operable for returning error conditions if said process request is an incompatible process request.

21. The data processing system of claim 19, wherein only said programmable file request emulator has to be modified when said application program is ported to different operating systems with which said application program shares incompatible but executable processes.

22. The data processing system of claim 19 wherein said application program file request commands comprise file read, write, truncate, unlock, lock shared, lock exclusive, lock atomic, and lock exclusive atomic commands.

23. The data processing system of claim 19 wherein said file lock query commands assess whether a file is locked, locked shared or locked exclusive.

24. The data processing system of claim 19 wherein error notification includes a recovery action options available to a user of said application program.

* * * * *